United States Patent
Obe et al.

(10) Patent No.: US 12,337,850 B2
(45) Date of Patent: Jun. 24, 2025

(54) VEHICLE, DATA COLLECTION SYSTEM, AND METHOD OF COLLECTING DATA OF VEHICLE

(71) Applicant: KAWASAKI MOTORS, LTD., Akashi (JP)

(72) Inventors: Yu Obe, Kobe (JP); Kazuya Nagasaka, Kobe (JP); Shohei Hosokawa, Kobe (JP); Takayuki Higashi, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 267 days.

(21) Appl. No.: 18/192,116

(22) Filed: Mar. 29, 2023

(65) Prior Publication Data

US 2024/0326832 A1 Oct. 3, 2024

(51) Int. Cl.
*B60W 40/10* (2012.01)

(52) U.S. Cl.
CPC ....... *B60W 40/10* (2013.01); *B60W 2520/105* (2013.01); *B60W 2520/125* (2013.01)

(58) Field of Classification Search
CPC ........... B60W 40/10; B60W 2520/105; B60W 2520/125; B60W 2050/0027; B60W 2050/005; B60W 40/109; B60W 40/107; G07C 5/008
See application file for complete search history.

(56) References Cited

U.S. PATENT DOCUMENTS

| | | | | |
|---|---|---|---|---|
| 10,466,717 | B1 * | 11/2019 | Su | G08G 1/0968 |
| 2014/0257625 | A1 * | 9/2014 | Kusuno | G07C 5/008 |
| | | | | 701/31.4 |
| 2018/0061150 | A1 * | 3/2018 | Harish | G01C 21/10 |
| 2019/0270457 | A1 * | 9/2019 | Chen | H04W 4/027 |
| 2021/0192867 | A1 * | 6/2021 | Fang | G07C 5/0808 |
| 2023/0391360 | A1 * | 12/2023 | Zhu | B60T 17/22 |
| 2024/0326832 | A1 * | 10/2024 | Obe | B60W 40/107 |

FOREIGN PATENT DOCUMENTS

| | | | | |
|---|---|---|---|---|
| CN | 103917932 A | * | 7/2014 | G07C 5/008 |
| EP | 3089117 A1 | * | 11/2016 | |
| JP | 2004237861 A | | 8/2004 | |

OTHER PUBLICATIONS

EP-3089117-A1 translation (Year: 2016).*
CN-103917932-A translation (Year: 2014).*
Sensor_based_extraction_approaches_of_in_vehicle_information (Year: 2020).*

* cited by examiner

*Primary Examiner* — Kyle T Johnson
(74) *Attorney, Agent, or Firm* — Alleman Hall & Tuttle LLP (57) ABSTRACT

A vehicle includes: a vehicle body; at least one state sensor that is supported by the vehicle body and detects state values that are parameters related to states of the vehicle; a communicator supported by the vehicle body; at least one memory supported by the vehicle body; and processing circuitry supported by the vehicle body. The processing circuitry is configured to: store in the memory the state values detected by the state sensor with a predetermined detection cycle; extract, every predetermined set time that is longer than the detection cycle, some of the state values stored within the set time such that the extracted state values include a largest value and a smallest value among the state values stored within the set time; and transmit the extracted state values through the communicator to an external device.

15 Claims, 8 Drawing Sheets

VEHICLE, DATA COLLECTION SYSTEM, AND METHOD OF COLLECTING DATA OF VEHICLE

BACKGROUND OF THE INVENTION

Field of the Invention

The present disclosure relates to a vehicle, a data collection system, and a method of collecting data of a vehicle.

Description of the Related Art

JP 2004-237861 A discloses a tire sensing system constituted by: an in-tire microcomputer system located inside a tire; and an in-vehicle data analysis display device located at a vehicle body.

SUMMARY OF THE INVENTION

A vehicle according to one aspect of the present disclosure includes: a vehicle body; at least one state sensor that is supported by the vehicle body and detects state values that are parameters related to states of the vehicle; a communicator supported by the vehicle body; at least one memory supported by the vehicle body; and processing circuitry supported by the vehicle body. The memory stores the state values detected by the state sensor with a predetermined detection cycle. The processing circuitry is configured to extract, every predetermined set time that is longer than the detection cycle, some of the state values stored within the set time such that the extracted state values include a largest value and a smallest value among the state values stored within the set time. The processing circuitry is configured to transmit the extracted state values through the communicator to an external device.

A data collection system according to one aspect of the present disclosure is a data collection system that collects data, related to states of a vehicle, in a server. The data collection system includes: at least one memory; and processing circuitry. The at least one memory stores state values detected by at least one state sensor with a predetermined detection cycle, the at least one state sensor detecting the state values that are parameters related to the states of the vehicle. The processing circuitry is configured to extract, every predetermined set time that is longer than the detection cycle, some of the state values stored within the set time such that the extracted state values include a largest value and a smallest value among the state values stored within the set time. The processing circuitry is configured to transmit the extracted state values to the server.

A method according to one aspect of the present disclosure is a method of collecting data related to states of a vehicle, the method being executed in a system including processing circuitry and at least one memory. The method includes: storing state values that are parameters related to the states of the vehicle and are detected by at least one state sensor, supported by a vehicle body of the vehicle, with a predetermined detection cycle; and extracting, every predetermined set time that is longer than the detection cycle, some of the state values stored within the set time such that the extracted state values include a largest value and a smallest value among the state values stored within the set time.

The above object, other objects, features, and advantages of the present disclosure will be made clear by the following detailed explanation of preferred embodiments with reference to the attached drawings.

The above object, other objects, features, and advantages of the present disclosure will be made clear by the following detailed explanation of preferred embodiments with reference to the attached drawings.

DESCRIPTION OF THE PREFERRED EMBODIMENTS

Hereinafter, an embodiment will be described with reference to the drawings.

Outline of System

Figure 1:
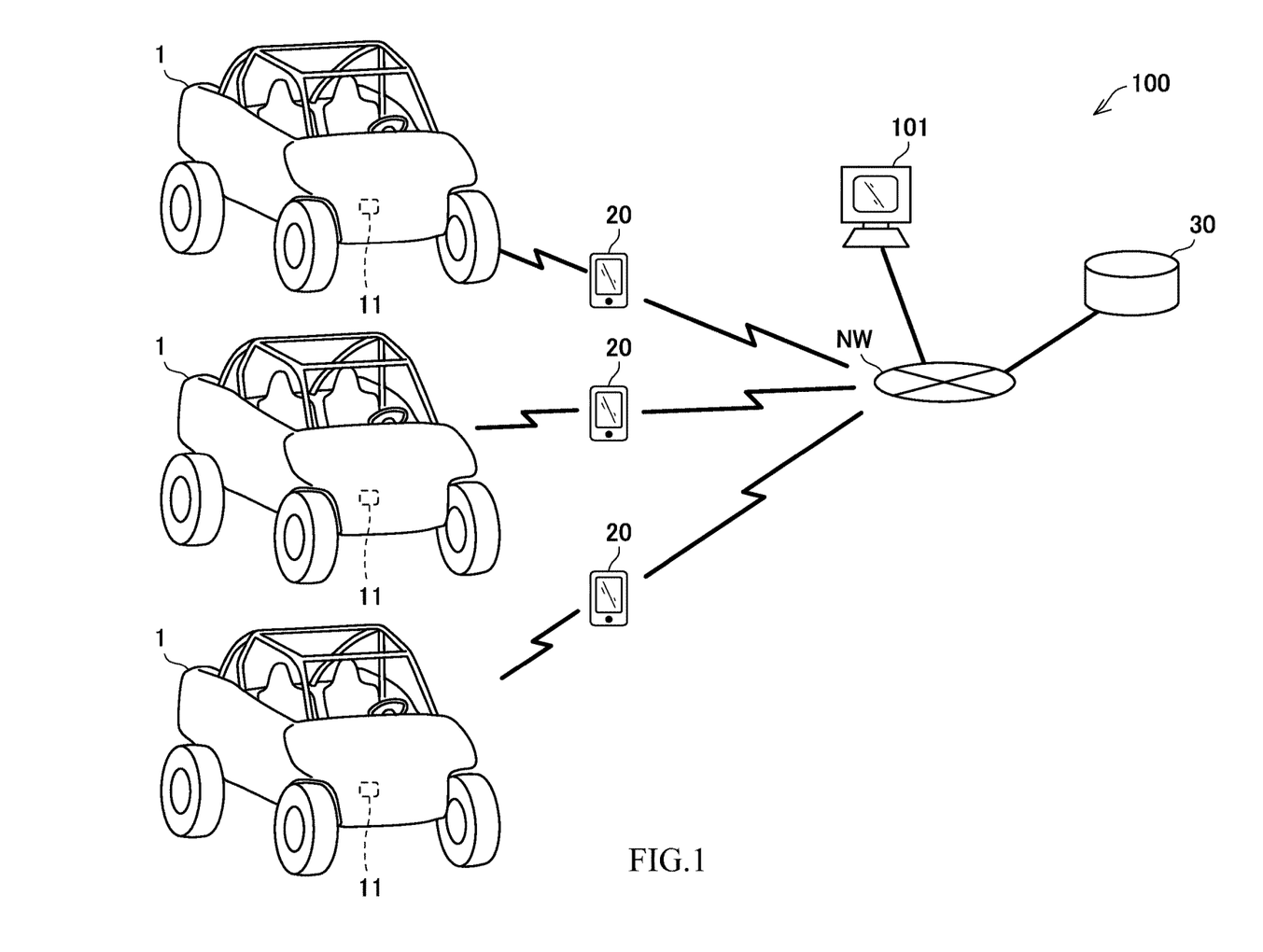
FIG. 1 is a schematic diagram showing a schematic configuration of an entire data collection system according to Embodiment 1.

FIG. 1 is a schematic diagram showing a schematic configuration of an entire data collection system 1 according to Embodiment 1 of the present disclosure. The data collection system 100 includes vehicles 1, terminals 20, and a server 30. Each vehicle 1 includes at least one state sensor 11 that detects a physical quantity (hereinafter referred to as a state value or state information) related to a state of the vehicle 1. The data collection system 100 is a system that collects the state information from the vehicles 1 through the terminals 20 to the server 30.

The state information collected in the server 30 by the data collection system 100 can be utilized for vehicle development, maintenance service, and the like. For example, the vehicle 1 is an all terrain vehicle used to travel on unleveled road surfaces, so-called unleveled ground. As one example of this type of all terrain vehicle, a utility vehicle is described in the present embodiment. The all terrain vehicle travels on uneven road surfaces more frequently than a vehicle which travels on leveled ground. In this case, impact and the like received by the vehicle 1 from the road surface significantly change depending on influences of the traveling road surface where the vehicle 1 travels and influences of a traveling operation of a driver. In the vehicle development, it is important to understand what kind of load the vehicle 1 is cumulatively receiving. Vehicle developers can utilize the state information collected in the server 30 for strength design of vehicles.

Moreover, it is assumed that how to use the vehicle 1 differs among users. As one example, the same type of vehicles 1 may be utilized for transportation of burdens in farm work, hunting, sport traveling, and some of these purposes. Maintenance service companies can utilize the state information collected in the server 30 for providing maintenance services corresponding to use states of the vehicles 1 of the users.

When all the data detected by the state sensor 11 is accumulated in the server 30, a storage area of the server 30 may be occupied by the data. Therefore, builders of the present system have conceived that to reduce the amount of data transmitted to the server 30, part of the data detected by the state sensor 11 is thinned out, and the obtained data is transmitted to the server 30. However, there is a possibility that when the data detected by the state sensor 11 is simply extracted at regular time intervals, and the extracted data is transmitted to the server 30, a characteristic value in the data detected by the state sensor 11 is thinned out, and as a result, the reliability and accuracy of the state information accumulated in the server 30 deteriorate. In the present embodiment, such problem is solved by below-described data collection processing.

Hardware Configuration

A hardware configuration of the data collection system 100 shown in FIG. 1 will be described with reference to FIG. 2. Specifically, hardware configurations of the vehicle 1, the terminal 20, and the server 30 will be described with reference to FIG. 2.

Vehicle

Figure 2:
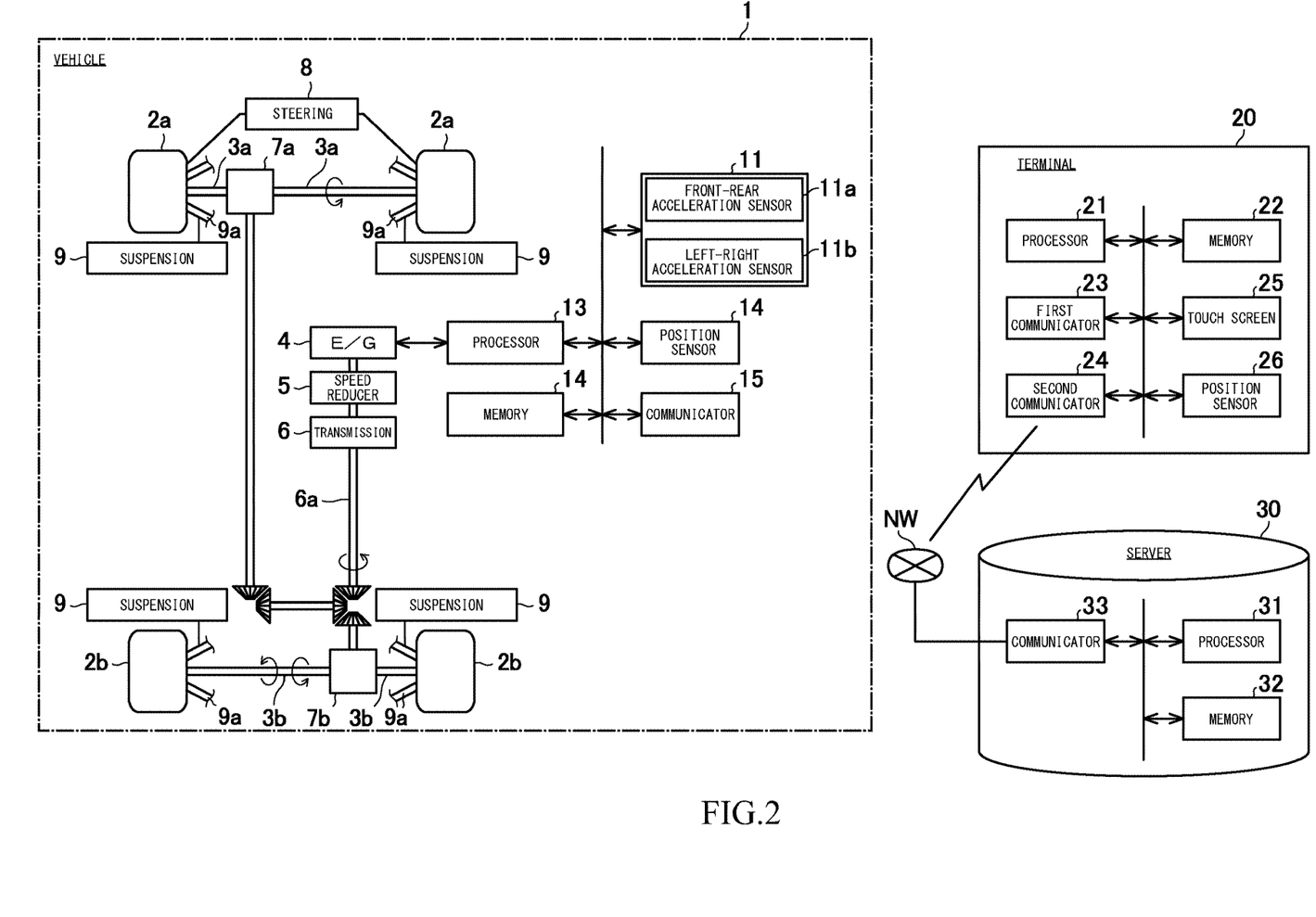
FIG. 2 is a block diagram showing a hardware configuration of the system shown in FIG. 1.

As described above, in the present embodiment, the vehicle 1 is a utility vehicle and includes a vehicle body frame (not shown in FIG. 2). A pair of left and right front wheels 2*a* are supported at a front portion of the vehicle body frame, and a pair of left and right rear wheels 2*b* are supported at a rear portion of the vehicle body frame. Front wheel brakes (not shown) are located at the front wheels 2*a*, and rear wheel brakes (not shown) are located at the rear wheels 2*b*. A pair of front drive shafts 3*a* extending in a left-right direction are respectively coupled to the front wheels 2*a*. A pair of rear drive shafts 3*b* extending in the left-right direction are respectively coupled to the rear wheels 2*b*.

Moreover, the vehicle 1 includes an engine unit that is a traveling driving source. The engine unit integrally includes an engine 4, a speed reducer 5, and a transmission 6 and is supported by the vehicle body frame. The engine 4 is an internal combustion engine. The engine 4 is, for example, a gasoline engine. The transmission 6 is, for example, a belt continuously variable transmission. Rotational power of the engine is changed in speed through the speed reducer 5 and the transmission 6 and is transmitted to an output shaft 6*a*. The rotational power transmitted to the output shaft 6*a* is transmitted to the front drive shafts 3*a* through a front wheel differential gear 7*a* and also transmitted to the rear drive shafts 3*b* through a rear wheel differential gear 7*b*.

The front wheel differential gear 7*a* is a mechanism that allows a rotation difference between the front wheels 2*a*, and the rear wheel differential gear 7*b* is a mechanism that allow a rotation difference between the rear wheels 2*b*. Each of the front wheel differential gear 7*a* and the rear wheel differential gear 7*b* has a differential lock (diff-lock) function that prevents, for example, the rotational frequency difference from being allowed. Moreover, the vehicle 1 has a power transmission switching function that can change the number of driving wheels rotated by the traveling driving source. Specifically, the vehicle 1 can switch between a four-wheel drive state in which the front and rear wheels 2*a* and 2*b* drive and a two-wheel drive state in which only the rear wheels 2*b* drive.

Moreover, the vehicle 1 includes a steering 8 that changes a traveling direction. The steering 8 includes: a steering wheel located at a driver's seat; and a steering structure that changes the direction of the front wheels 2*a* in accordance with the rotation of the steering wheel.

Moreover, the vehicle 1 includes suspensions 9 respectively located at four wheels 2*a* and 2*b*. The suspensions 9 are buffers that prevent the unevenness of the road surface from being transmitted to the vehicle body. Each of the suspensions 9 includes a swinging arm 9*a*, a spring (not shown), and a shock absorber (not shown). The swinging arm 9*a* supports the wheel 2*a* or 2*b* such that the wheel 2*a* or 2*b* can swing relative to the vehicle body frame. The spring (not shown) absorbs the impact transmitted from the wheel 2*a* or 2*b*. The shock absorber (not shown) is coupled to the swinging arm 9*a* and attenuates the vibration of the spring. For example, the swinging arm 9*a* is an upper arm of a double wishbone suspension, i.e., a so-called A arm.

The vehicle 1 includes the state sensor 11, a position sensor 12, at least one processor 13, at least one memory 14, and a communicator 15. The at least one state sensor 11, the position sensor 12, the at least one processor 13, the at least one memory 14, and the communicator 15 are in connection with each other through a CAN bus such that data transmission can be performed thereamong. In FIG. 2, each of the at least one state sensor 11, the at least one processor 13, and the at least one memory 14 is shown by a single block. The processor 13 is one example of processing circuitry or first processing circuitry.

The at least one state sensor 11 detects state values that are parameters related to states of the vehicle 1. The at least one state sensor 11 includes: a front-rear acceleration sensor 11*a* that detects accelerations in a front-rear direction of the vehicle 1; and a left-right acceleration sensor 11*b* that detects accelerations in a left-right direction of the vehicle 1. The vehicle 1 may include an IMU (Inertial Measurement Unit), and the front-rear acceleration sensor 11*a* and the left-right acceleration sensor 11*b* may be part of the IMU.

The position sensor 12 detects a geographical position of the vehicle 1. The position sensor 12 is a GPS (Global Positioning System) sensor.

The at least one processor 13 controls various control targets, such as the engine 4, mounted on the vehicle 1 based on detected values detected by the state sensors 11. The at least one memory 14 includes a volatile memory and a non-volatile memory. The at least one memory 14 includes a memory storing a program executed by the processor 13, a memory accumulating data received from the state sensor 11 and the position sensor 12, and the like. The processor 13 reads a data collection program stored in the memory to execute the below-described data collection processing.

The state sensor 11 detects the state value with a predetermined detection cycle. In the present embodiment, a sampling rate of the state sensor 11 is 200 Hz. To be specific, the state sensor 11 detects the state value at a time interval of five milliseconds. The memory 14 stores the state values detected by the state sensor 11. The position sensor 12 detects positional information at the same sampling rate as the state sensor 11, i.e., at the sampling rate of 200 Hz.

The communicator 15 performs wireless communication with a first communicator 23 of the terminal 20. The communicator 15 can execute near field communication with the first communicator 23 of the terminal 20. Each of the communicator 15 and the first communicator 23 includes an antenna, a RF (Radio Frequency) circuit, and the like. In the present embodiment, the wireless communication performed by the communicator 15 and the first communicator 23 is Bluetooth (trademark) communication and is realized by pairing. The pairing denotes the execution of mutual authentication by which devices (in the present embodiment, the communicator 15 and the first communicator 23) can communicate with each other and are prevented from communicating with unrelated nearby devices. The near field communication performed by the communicator 15 is not limited to the Bluetooth (trademark) communication, and another type of communication system, such as infrared communication, may be adopted.

The communicator 15 and the first communicator 23 intermittently perform communication at a predetermined communication interval (also referred to as a transmission cycle or a connection interval). In the present embodiment, the communication interval is 200 milliseconds. To be specific, data is transmitted from the communicator 15 to the first communicator 23 five times per second.

Terminal

For example, the terminal 20 is an information terminal carried by an occupant of the vehicle 1. The information terminal is, for example, a smartphone (multifunctional mobile phone). The terminal 20 can perform transmission and reception of data with the predetermined server 30 connected through the Internet or the like. The terminal 20 includes at least one processor 21, at least one memory 22, the first communicator 23, a second communicator 24, a touch screen 25, and a position sensor 26 as hardware. These components 21, 22, 23, 24, and 25 are in connection with each other such that data transmission can be performed thereamong.

The at least one memory 22 includes a volatile memory and a non-volatile memory. The at least one memory 22 includes a memory storing a program executed by the processor 21, a memory accumulating data received from the vehicle 1 through the first communicator 23, and the like. The processor 21 is one example of second processing circuitry.

The first communicator 23 performs wireless communication with a communicator 33 located at the vehicle 1. Since the first communicator 23 is the same in configuration as the communicator 15, an explanation thereof is omitted.

The second communicator 24 performs data communication with the communicator 33 of the server 30 through a network NW, such as the Internet, by wireless communication.

The touch screen 25 serves as both an inputter that receives a manipulation input from the user and a display that displays a screen image visually confirmable by the user. Specifically, as the display, the touch screen 25 includes a semi-transmissive display and a back light LED. Moreover, as the inputter, the touch screen 25 includes a touch panel located on the display. The inputter and the display in the terminal 20 do not have to be integrated with each other and may be separated from each other.

The position sensor 26 detects a geographical position of the terminal 20. The position sensor 26 is a GPS (Global Positioning System) sensor.

Server

The server 30 includes at least one processor 31, at least one memory 32, and the communicator 33 as hardware. These components 31, 32, and 33 are in connection with each other such that data transmission can be performed thereamong.

The at least one memory 32 includes a volatile memory and a non-volatile memory. The at least one memory 32 includes a memory 32 storing a program executed by the processor 31, a memory accumulating data received from the terminal 20 through the second communicator 24, and the like. The communicator 33 communicates with the second communicator 24 of the terminal 20 through the network NW. The processor 31 is one example of third processing circuitry.

Data Collection Processing According to Embodiment 1

Figure 3:
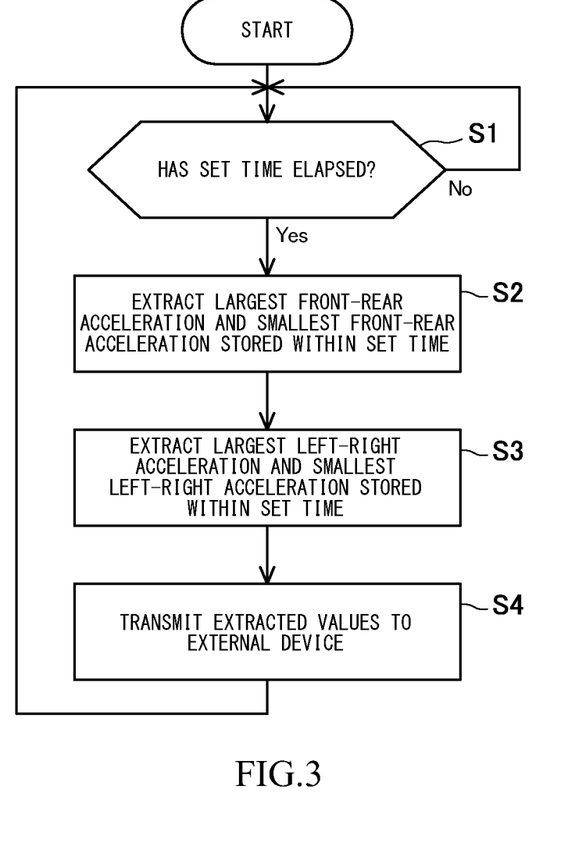
FIG. 3 is a flowchart showing the flow of data collection processing according to Embodiment 1.

FIG. 3 is a flowchart showing the flow of the data collection processing according to Embodiment 1. The data collection processing is executed in real time while the vehicle 1 is traveling.

While the vehicle 1 is traveling, each of the front-rear acceleration sensor 11*a* and the left-right acceleration sensor 11*b* detects the state values at a predetermined sampling rate (in this example, 200 Hz), and the detected state information is stored in the memory 14. To be specific, the front-rear acceleration and the left-right acceleration are accumulated in the memory 14 every five milliseconds that is the detection cycle of the sensor 11. Each of the state values is stored in the memory 14 in association with time information regarding a time at which the state value is detected or a time at which the state value is stored. The positional information detected by the position sensor 12 is also stored in the memory 14 every five milliseconds in association with the time information.

In the data collection processing, the at least one processor 13 determines whether or not a predetermined set time has elapsed (Step S1). The set time is a time longer than the detection cycle. The set time is set to a time that is closer to the transmission cycle (in this example, 200 milliseconds) of the communicator 15 than the detection cycle (in this example, five milliseconds) of the state sensor 11. In the present embodiment, the set time is set to a time that is the same as the transmission cycle of the communicator 15. To be specific, in the present embodiment, the set time is set to 200 milliseconds.

When the at least one processor 13 determines that the set time has elapsed (Yes in Step S1), the at least one processor 13 extracts, for each type of state value, a largest value and a smallest value from the state values detected within the set time. To be specific, the at least one processor 13 extracts a largest front-rear acceleration and a smallest front-rear acceleration from the front-rear accelerations stored within the set time (Step S2) and extracts a largest left-right acceleration and a smallest left-right acceleration from the left-right accelerations stored within the set time (Step S3).

The at least one processor 13 transmits the extracted largest value and the extracted smallest value to the terminal 20 through the communicator 15 (Step S4). More specifically, the at least one processor 13 transmits the extracted largest value and the extracted smallest values to the terminal 20 together with the time information stored in association with the largest value and the time information stored in association with the smallest value (Step S4). After Step S4, the process returns to Step S1.

The terminal 20 transmits data, transmitted from the communicator 15 of the vehicle 1, to the server 30. The server 30 accumulates the received data in the memory 32. Thus, four state values that are the largest front-rear acceleration, the smallest front-rear acceleration, the largest left-right acceleration, and the smallest left-right acceleration among all the state values detected by the front-rear acceleration sensor 11a and the left-right acceleration sensor 11b within the set time are sequentially accumulated.

After the at least one processor 13 has extracted the state values in Step S3, the at least one processor 13 may delete from the memory 14 the state values that have not been extracted among the state values stored within the set time. With this, the capacity of the memory 14 can be prevented from being occupied by the state values. The state values that have not been extracted may be deleted immediately after the state values have been extracted in Step S3 or when the state values have exceeded a predetermined amount of data.

As described above, according to the present embodiment, while reducing the amount of data transmitted to the terminal 20 that is an external device, the largest value and smallest value of the state values which are characteristic information in each set time can be transmitted to the terminal 20.

Figure 4:
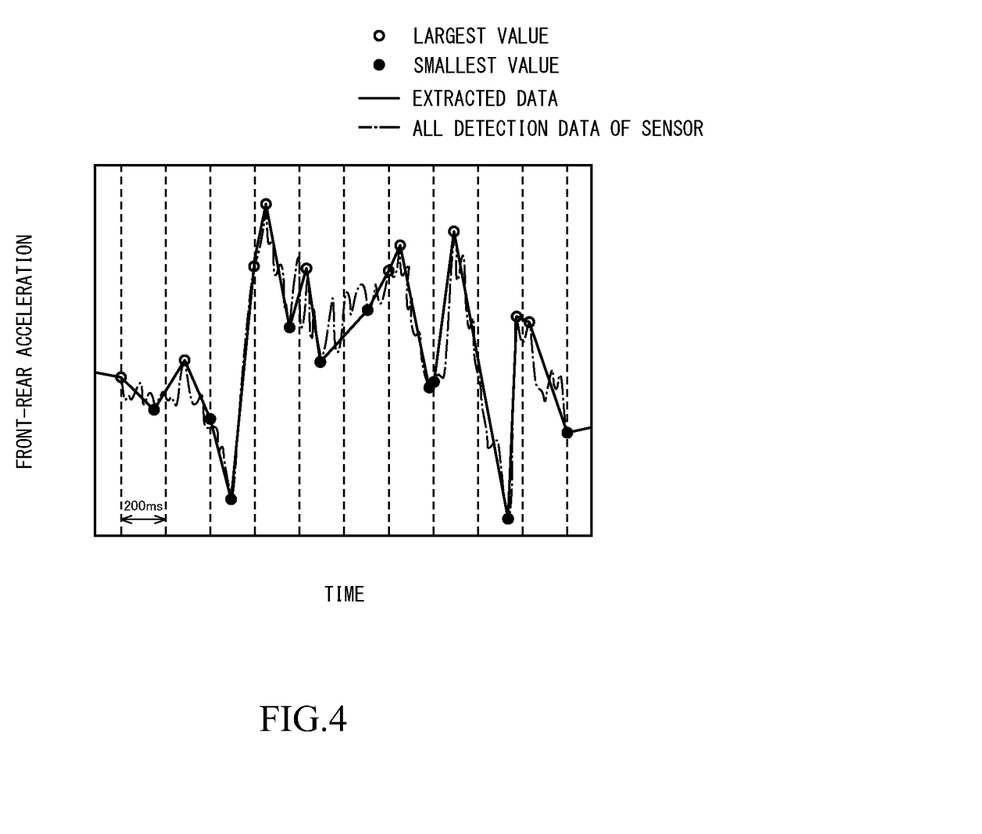
FIG. 4 is a graph showing time-series data of front-rear accelerations extracted by the data collection processing according to Embodiment 1.
Figure 5:
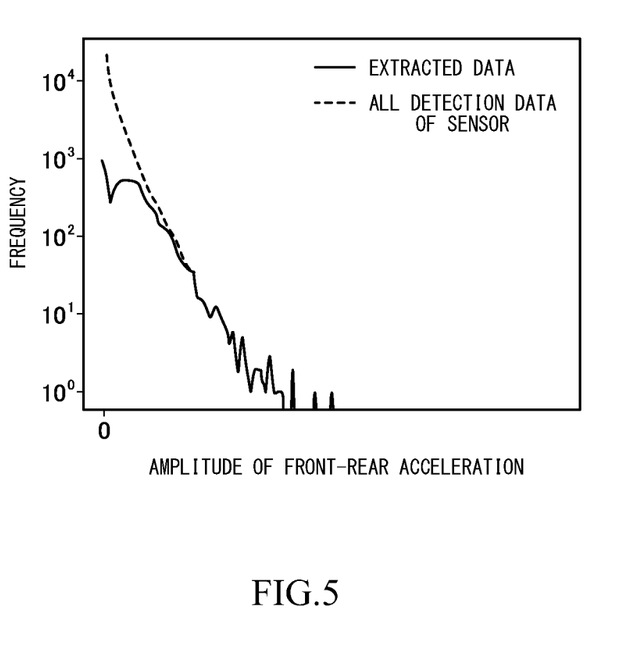
FIG. 5 is a graph showing a relationship between an amplitude of the front-rear acceleration extracted by the data collection processing according to Embodiment 1 and a frequency.

The advantages of the data collection processing of the present embodiment will be described with reference to FIGS. 4 and 5 from the viewpoint of cumulative fatigue evaluation of the vehicle 1. FIGS. 4 and 5 are diagrams for comparing a graph of all the detection data detected by the state sensor 11 with a graph of the data extracted from all the detection data by the data collection processing of the present embodiment.

FIG. 4 is a graph showing time-series data of the front-rear accelerations. In FIG. 4, a horizontal axis shows a time, and a vertical axis shows the front-rear acceleration. In FIG. 4, a graph of all the detection data detected by the front-rear acceleration sensor 11a at a sampling rate of 200 Hz is shown by a broken line, and a graph of the time-series data of the front-rear accelerations extracted from all the detection data by the data collection processing is shown by a solid line. Moreover, in FIG. 4, the largest values of the front-rear accelerations extracted by the data collection processing for the respective set times (in this example, 200 milliseconds) are plotted by white circles, and the smallest values thereof are plotted by black circles.

FIG. 5 is a graph showing a relationship between an amplitude of the front-rear acceleration extracted by the data collection processing according to Embodiment 1 and a frequency. Specifically, the graph is obtained by converting the time-series data (also referred to as extracted data) of the front-rear accelerations extracted by the data collection processing of Embodiment 1 into the relationship between the amplitude of the front-rear acceleration and the frequency of the amplitude by a rainflow method. The rainflow method is a known frequency counting method used to estimate the life of an object until fatigue breakdown of the object occurs when the object repeatedly receives irregular fluctuating stress. In FIG. 5, a horizontal axis shows the amplitude of the front-rear acceleration, and a vertical axis shows the frequency. The amplitude of the front-rear acceleration which is shown by the horizontal axis is a value corresponding to a change in the stress received by the vehicle 1. That the amplitude of the front-rear acceleration is large denotes that the vehicle 1 receives large stress.

In FIG. 5, a graph obtained by converting all the detection data of the front-rear acceleration sensor 11a by the rainflow method is shown by a broken line, and a graph obtained by converting, by the rainflow method, the extracted data extracted from all the detection data by the data collection processing is shown by a solid line. In FIG. 5, according to comparison between the graph of the extracted data and the graph of all the detection data, in a region where the amplitude of the front-rear acceleration is relatively small, the graphs deviate from each other. However, in a region where the amplitude of the front-rear acceleration is relatively large, the graphs substantially coincide with each other.

When the amplitude of the front-rear acceleration is relatively small, the influence on the fatigue breakdown is small. Moreover, it is generally known that there may exist a lower limit (so-called fatigue limit) of repeated stress which does not cause breakdown of a material even if the repeated stress is applied to the material an infinite number of times. It can be said that the frequency of the amplitude of the front-rear acceleration which corresponds to the stress that is not more than the fatigue limit is a value that is ignorable in the cumulative fatigue evaluation.

On the other hand, the degree of generation of the front-rear acceleration whose amplitude is relatively large significantly influences the cumulative damage of the vehicle 1. In the region where the amplitude of the front-rear acceleration is relatively large in FIG. 5, the graph of the extracted data and the graph of all the detection data substantially coincide with each other, and therefore, the cumulative fatigue evaluation whose accuracy is substantially equal to the accuracy of the cumulative fatigue evaluation performed by using all the detection data is used can be performed by using the extracted data.

If all the detection data is simply extracted at regular time intervals, i.e., every 200 milliseconds instead of the data collection processing, the large amplitude of the front-rear acceleration generated within 200 milliseconds is not extracted, i.e., leaks. Therefore, when the graph of the extracted data extracted with a low sampling cycle and the graph of all the detection data are compared with each other, the graphs may deviate from each other in the region where the amplitude of the front-rear acceleration is relatively large. To be specific, even when processing of extracting data with a low sampling cycle is used to reduce the amount of data, there may be a disadvantage in which there is a possibility that the front-rear acceleration of a relatively large amplitude which is important for evaluating the cumulative fatigue of the vehicle 1 cannot be extracted.

In the present embodiment, while avoiding such disadvantage, more specifically, while preventing a characteristic amount, which is important in the cumulative fatigue evaluation, from being thinned out, a reduction in the amount of data transmitted and a reduction in the amount of data stored in the server 30 can be realized.

Data Collection Processing According to Embodiment 2

Next, Embodiment 2 will be described with reference to FIGS. 6 to 8. The data collection processing of Embodiment 2 is different from that of Embodiment 1. Since the hardware configuration of the data collection system of Embodiment 2 is similar to that of Embodiment 1, an explanation thereof is omitted.

Figure 6:
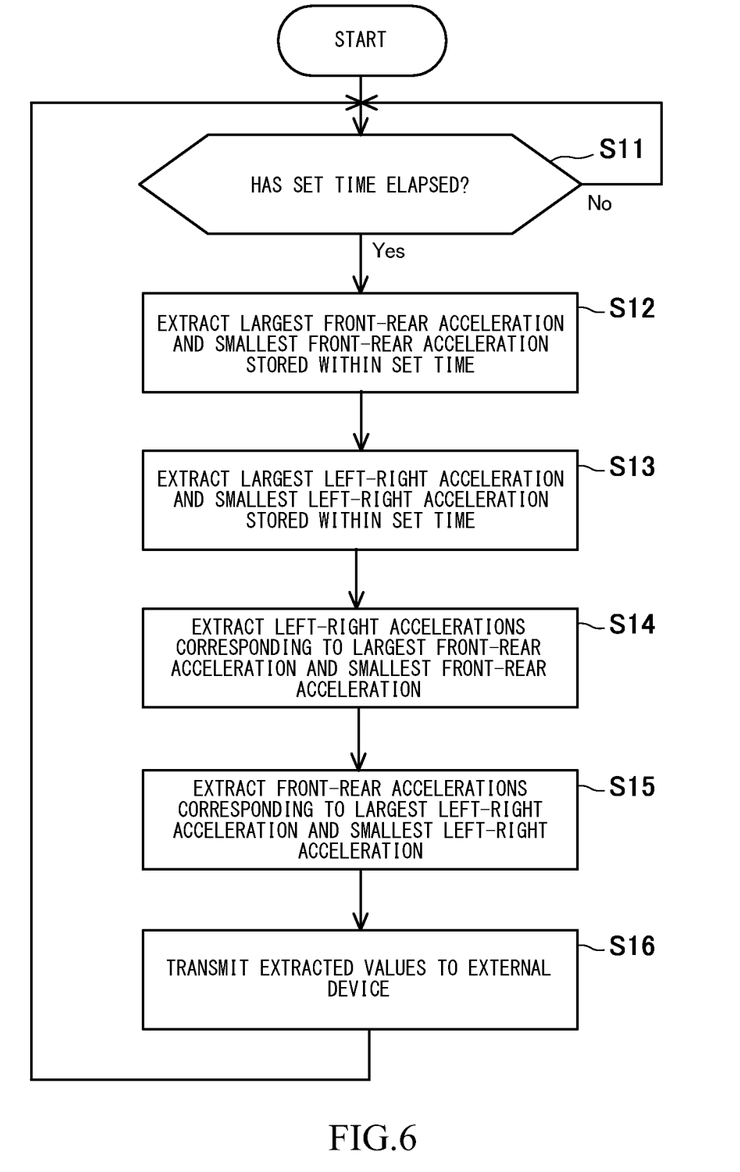
FIG. 6 is a flowchart showing the flow of the data collection processing according to Embodiment 2.

FIG. 6 is a flowchart showing the flow of the data collection processing according to Embodiment 2. The data collection processing is executed in real time while the vehicle 1 is traveling. Steps S11, S12, and S13 of the data collection processing according to the present embodiment are respectively the same as Steps S1, S2, and S3 of the data collection processing according to Embodiment 1. To be specific, in the data collection processing of the present embodiment, the at least one processor 13 determines whether or not the set time has elapsed (Step S11). When the at least one processor 13 determines that the set time has elapsed (Yes in Step S11), the at least one processor 13 extracts the largest value and the smallest value from the state values detected within the set time, as with the data collection processing of Embodiment 1. To be specific, the at least one processor 13 extracts the largest front-rear acceleration and the smallest front-rear acceleration from the front-rear accelerations stored within the set time (Step S12), and extracts the largest left-right acceleration and the smallest left-right acceleration from the left-right accelerations stored within the set time (Step S13).

In the data collection processing of the present embodiment, the at least one processor 13 further extracts, from the left-right accelerations stored within the set time, a corresponding first left-right acceleration that is a value detected when the largest front-rear acceleration is detected, and a corresponding second left-right acceleration that is a value detected when the smallest front-rear acceleration is detected (Step S14), and extracts, from the front-rear accelerations stored within the set time, a corresponding first front-rear acceleration that is a value detected when the largest left-right acceleration is detected, and a corresponding second front-rear acceleration that is a value detected when the smallest left-right acceleration is detected (Step S15).

Steps S14 and S15 will be described in more detail with reference to FIG. 7. FIG. 7 is a diagram for explaining a method of extracting data by the data collection processing from the data of the front-rear accelerations and the left-right accelerations. In FIG. 7, the graph of the time-series data of the front-rear acceleration in the set time is shown by a solid line, and the graph of the time-series data of the left-right acceleration in the set time is shown by a broken line. Moreover, in FIG. 7, the largest front-rear acceleration and the largest left-right acceleration extracted by the data collection processing are plotted by white circles, and the smallest front-rear acceleration and the smallest left-right acceleration extracted by the data collection processing are plotted by black circles.

Figure 7:
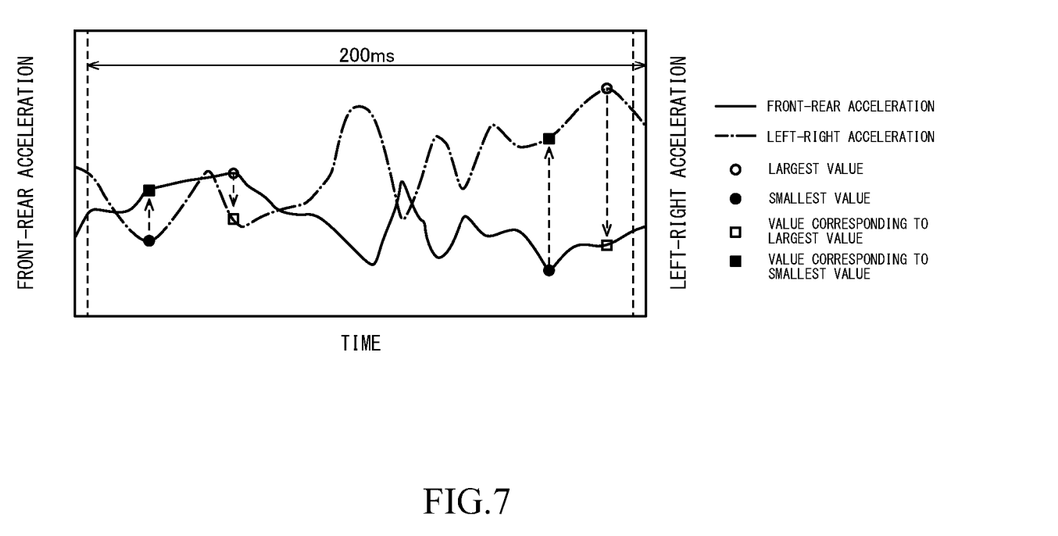
FIG. 7 is a diagram for explaining a method of extracting data by the data collection processing from data of the front-rear accelerations and left-right accelerations.
Figure 8:
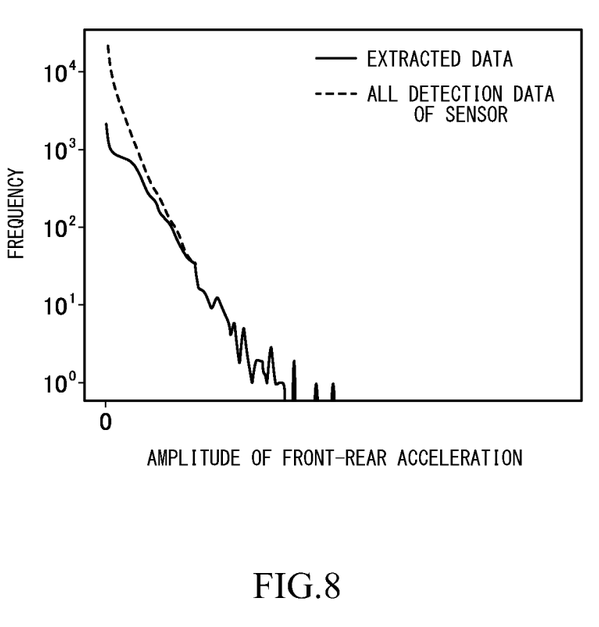
FIG. 8 is a graph showing a relationship between the amplitude of the front-rear acceleration extracted by the data collection processing according to Embodiment 2 and the frequency.

Moreover, in FIG. 7, values extracted in Steps S14 and S15 are shown by white squares and solid squares. Specifically, the corresponding first left-right acceleration that is the left-right acceleration stored in association with the time information that is the same as the time information stored in association with the largest front-rear acceleration and the corresponding first front-rear acceleration that is the front-rear acceleration stored in association with the time information that is the same as the time information stored in association with the largest left-right acceleration are shown by white squares. Moreover, the corresponding second left-right acceleration that is the left-right acceleration stored in association with the time information that is the same as the time information stored in association with the smallest front-rear acceleration and the corresponding second front-rear acceleration that is the front-rear acceleration stored in association with the time information that is the same as the time information stored in association with the smallest left-right acceleration are shown by solid squares. As above, the front-rear acceleration and the left-right acceleration which are stored in association with the same time information are extracted as one set through Steps S12, 13, 14, and 15.

As shown in FIG. 6, the at least one processor 13 transmits the extracted state values to the terminal 20 through the communicator 15 (Step S16). More specifically, the at least one processor 13 transmits the extracted state values to the terminal 20 together with the time information stored in association with these state values (Step S3). After Step S16, the process returns to Step S11.

The terminal 20 transmits the data, transmitted from the communicator 15 of the vehicle 1, to the server 30. The server 30 accumulates the received data in the memory 32. Thus, among all the state values detected by the front-rear acceleration sensor 11a and the left-right acceleration sensor 11b within the set time, eight state values that are the largest front-rear acceleration, the smallest front-rear acceleration, the largest left-right acceleration, the smallest left-right acceleration, the left-right acceleration corresponding to the largest front-rear acceleration, the left-right acceleration corresponding to the smallest front-rear acceleration, the front-rear acceleration corresponding to the largest left-right acceleration, and the front-rear acceleration corresponding to the smallest left-right acceleration are sequentially accumulated.

The present embodiment can obtain the same effects as Embodiment 1.

Moreover, the accuracy of the cumulative fatigue evaluation in the present embodiment can be improved more than that in Embodiment 1. FIG. 8 is a graph obtained by converting the time-series data (extracted data) of the front-rear acceleration extracted by the data collection processing of Embodiment 2 into the relationship between the amplitude of the front-rear acceleration and the frequency of the amplitude. In FIG. 8, the deviation between the graph of the extracted data and the graph of all the detection data in the region where the amplitude of the front-rear acceleration is relatively small is smaller than that in FIG. 5.

Moreover, in the present embodiment, the front-rear acceleration and the left-right acceleration which are stored in association with the same time information are extracted as one set. Therefore, the cumulative fatigue evaluation using both the front-rear acceleration and the left-right acceleration is easily performed. For example, a method of estimating tire force, which is force acting on a wheel 2a or 2b from a road surface, by using both the front-rear acceleration and the left-right acceleration is known. For example, U.S. patent application Ser. No. 17/203,486 describes a method and a formula by each of which force acting in a vertical direction from a road surface to a wheel of a four-wheeled vehicle is estimated by using a front-rear acceleration detected by a front-rear acceleration sensor and a left-right acceleration detected by a left-right acceleration sensor. Therefore, as with the present embodiment, since the front-rear acceleration and the left-right acceleration which have been detected at the same time are stored in the server 30 as one set, the evaluation of the state of the vehicle can be performed in more detail.

For example, based on the state values received from the vehicle 1, the processor 31 of the server 30 may estimate the tire force that is the force acting on the wheel 2a or 2b from the road surface. For example, the memory 32 may store an estimation program that estimates the tire force, which acts in the vertical direction from the road surface to the wheel 2a or 2b, by using the front-rear accelerations and the left-right accelerations as input parameters, and the processor 31 may output the tire force by using the estimation program based on the state values received from the vehicle 1. The processor 31 may estimate the tire force by using, for example, the estimation method described in U.S. patent application Ser. No. 17/203,486. The entire disclosure of U.S. patent application Ser. No. 17/203,486 is incorporated in the present application by reference.

Other Embodiments

The present disclosure is not limited to the above embodiment, and various modifications may be made within the scope of the present disclosure.

In the above embodiment, the utility vehicle is described as one example of the vehicle. However, the present disclosure is also applicable to vehicles, such as motorcycles, automatic three-wheeled vehicles, and riding lawn mowers, in addition to the utility vehicles. The driving source of the vehicle is not especially limited. The vehicle may be an engine vehicle or an electric vehicle. The present disclosure is especially suitable for off-road traveling vehicles which are assumed to be used in various use situations.

The front-rear acceleration sensor 11a and the left-right acceleration sensor 11b are described as the state sensors, but the state sensors are not limited to these. The detected value of the state sensor is a value that fluctuates with time. It is preferable that the state sensor be, for example, a sensor that detects a physical quantity which repeatedly increases and decreases within one second. For example, the state sensor may be a front-rear acceleration sensor, a left-right acceleration sensor, an upper-lower acceleration sensor that detects an acceleration of a vehicle body of a vehicle in an upper-lower direction, a three-axis angular velocity sensor that detects angular velocities of a vehicle body in a pitch direction, a roll direction, and a yaw direction, a rotational frequency sensor that detects a rotational frequency of a traveling driving source, a pitch rate sensor, a steering angle sensor, a vehicle speed sensor that detects a traveling speed of a vehicle, a wheel speed sensor that detects a rotational frequency of a wheel, a steering angle sensor, a suspension stroke sensor, a combination of one or more of these, or the like.

The communicator 15 and the first communicator 23 may communicate with each other by a communication system other than the Bluetooth (trademark) communication. The communicator 15 and the first communicator 23 do not have to perform wireless communication and may perform wired communication.

Every predetermined set time that is a time longer than the detection cycle, the processor does not have to extract only the largest value and the smallest value from the state values stored within the set time. Every predetermined set time that is a time longer than the detection cycle, the processor may extract some of the state values stored within the set time from the state values stored within the set time such that the extracted state values include the largest value and the smallest value. For example, the processor may extract some of the state values stored within the set time such that the extracted state values include the largest value, a second largest value next to the largest value, the smallest value, and a second smallest value next to the smallest value from the state values stored within the set time.

In Embodiment 2 described above, the tire force estimated by the processor 31 is not limited to the force acting in the vertical direction on the wheel 2a or 2b from the road surface. For example, the tire force estimated by the processor 31 may be force acting in the front-rear direction on the wheel 2a or 2b from the road surface or may be force acting in the left-right direction on the wheel 2a or 2b from the road surface. Moreover, the state values used to estimate the tire force are not limited to the front-rear acceleration and the left-right acceleration which correspond to the same time information. For example, the state values used to estimate the tire force do not have to be the front-rear acceleration and the left-right acceleration which correspond to the same time information. For example, in Embodiment 1, the processor 31 may estimate the tire force by using the set of the front-rear acceleration and the left-right acceleration which have been extracted within the same set time. The state value used to estimate the tire force may be only one of the front-rear acceleration and the left-right acceleration, or the state values used to estimate the tire force may include another parameter in addition to one or both of the front-rear acceleration and the left-right acceleration.

Moreover, in the above embodiment, the data collection processing is executed by the processor 13 of the vehicle 1. However, the processor that executes the data collection processing is not limited to this. For example, the at least one processor 21 of the terminal device 20 may read the data collection program stored in the memory 22 to execute the data collection processing. In this case, the state values detected by the state sensor 11 of the vehicle may be transmitted to the terminal 20 through the communicator 15 and stored in the memory 22 of the terminal 20. The processor 21 of the terminal device 20 may extract, every set time, some of the state values stored within the set time in the memory 22 such that the extracted state values include the largest value and the smallest value among the state values stored within the set time. Then, the processor 21 of the terminal device 20 may transmit the extracted values to the server 30 that is an external device.

Or, the terminal 20 may include a state sensor, and the state sensor of the terminal 20 attached to the vehicle body of the vehicle may detect a physical quantity regarding the state of the vehicle. In this case, the step of transmitting to the terminal 20 the state value detected by the state sensor 11 of the vehicle can be omitted. To be specific, the state values detected by the state sensor of the terminal 20 may be stored in the memory 22, and the processor 21 may extract, every set time, some of the state values stored within the set time in the memory 22 such that the extracted values include the largest value and the smallest value among the state values stored within the set time. Then, the processor 21 of the terminal device 20 may transmit the extracted values to the server 30 that is the external device.

Moreover, when the processor 21 executes the data collection processing, the processor 21 may extract the state values, and then, delete from the memory 22 the state values which have not been extracted among the state values stored within the set time.

Moreover, in the above embodiment, the processor 13 transmits the extracted state values to the terminal 20 that is the external device together with the time information stored in association with the state values. However, the processor may transmit another type of information to the external device in addition to or instead of the time information. For example, the processor may acquire identification information for identifying the vehicle and positional information indicating the position of the vehicle and transmit the identification information and the positional information to the server when transmitting the extracted state values to the server. The identification information for identifying the vehicle may be stored in a memory of the vehicle in advance. The positional information indicating the position of the vehicle can be detected by a position sensor.

The terminal 20 may move together with the vehicle 1 while the vehicle 1 is traveling. For example, the terminal 20 may be fixed to the vehicle body in such a manner that a driver places the terminal 20 at a predetermined position of the vehicle 1 when getting in the vehicle 1. Or, the terminal 20 may be put in clothes or a bag of an occupant.

In the above embodiment, the data collection system 100 is a system that transmits the state information from the vehicle 1 through the terminal 20 to the server 30. However, the data collection system is not limited to this. The data collection system may be a system that transmits the state information from the vehicle to the server that is the external device without through the terminal.

In the above embodiment, the processor 13 executes the extraction of some of the state values and the transmission of the extracted state values in real time while the vehicle is traveling. In other words, in the above embodiment, every set time, some of the state values are extracted, and the extracted state values are immediately transmitted to the external device. However, an execution timing of the data collection processing is not limited to this. For example, the state values detected by the state sensor may be stored in the memory 14 in association with the time information while the vehicle is traveling, and the data collection processing may be executed at a timing at which the communicator 15 of the vehicle 1 and the first communicator 23 of the terminal 20 can communicate with each other.

Moreover, the terminal 20 does not have to transmit the state value to the server 30 immediately after the terminal 20 receives the state value from the communicator 15 of the vehicle 1. After the terminal 20 receives the state value from the communicator 15 of the vehicle 1, the terminal 20 may transmit the state value to the server 30 at a timing at which the user executes a predetermined operation with respect to the terminal device 20.

The non-volatile memory disclosed in the present specification includes, for example, a ROM, an EPROM, an EEPROM, a flash memory, a hard disk, an optical disk, or a combination of one or more of these. Moreover, the volatile memory includes, for example, a RAM.

The functionality of the elements disclosed herein may be implemented using circuitry or processing circuitry which includes general purpose processors, special purpose processors, integrated circuits, ASICs ("Application Specific Integrated Circuits"), conventional circuitry or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware or processor.

Moreover, various programs disclosed in the present specification are stored in a memory. The memory is a device which is incorporated in or externally attached to a computer and is readable and writable or readable. For example, the memory may be a hard disk, a flash memory, an optical disk, or the like. The program stored in the memory may be executed by a computer to which the memory is directly connected or may be downloaded to and executed by a computer connected to the memory through a network (for example, the Internet).

Disclosed Aspects

The following aspects disclose preferred embodiments.
First Aspect
A vehicle including:
a vehicle body;
at least one state sensor that is supported by the vehicle body and detects state values that are parameters related to states of the vehicle;
a communicator supported by the vehicle body;
at least one memory supported by the vehicle body; and
processing circuitry supported by the vehicle body, wherein:
the memory stores the state values detected by the state sensor with a predetermined detection cycle;
the processing circuitry is configured to extract, every predetermined set time that is longer than the detection cycle, some of the state values stored within the set time such that the extracted state values include a largest value and a smallest value among the state values stored within the set time; and
the processing circuitry is configured to transmit the extracted state values through the communicator to an external device.

According to the above aspect, while reducing the amount of data transmitted to the external device, the largest value and smallest value of the state values which are the characteristic information in each set time can be transmitted to the external device.
Second Aspect
The vehicle according to the first aspect, wherein extracting some of the state values stored within the set time denotes extracting, every set time, only some of the state values detected within the set time such that the extracted state values include the largest value and the smallest value among the state values stored within the set time.
Third Aspect
The vehicle according to the first or second aspect, wherein a total number of state values transmitted through the communicator is smaller than a total number of state values detected by the state sensor.
Fourth Aspect
The vehicle according to any one of the first to third aspects, wherein after the processing circuitry extracts some of the state values, the processing circuitry deletes from the memory the state values that have not been extracted among the state values stored within the set time.
Fifth Aspect
The vehicle according to any one of the first to fourth aspects, wherein the at least one state sensor detects accelerations of the vehicle.

According to the above aspect, while reducing the amount of data transmitted to the external device, the largest value and smallest value of the accelerations in each set time can be transmitted to the external device.
Sixth Aspect
The vehicle according to the fifth aspect, wherein the accelerations of the vehicle include a front-rear acceleration and left-right acceleration of the vehicle.
Seventh Aspect
The vehicle according to any one of the first to sixth aspects, wherein the set time is closer to a transmission cycle of the communicator than the detection cycle.
Eighth Aspect
The vehicle according to any one of the first to seventh aspects, wherein the communicator executes near field communication.

Ninth Aspect

The vehicle according to any one of the first to eighth aspects, wherein:
- the at least one state sensor detects front-rear accelerations and left-right accelerations of the vehicle; and
- extracting, every set time, some of the state values stored within the set time such that the extracted state values include the largest value and the smallest value includes
- extracting a largest front-rear acceleration and a smallest front-rear acceleration from the front-rear accelerations stored within the set time,
- extracting a largest left-right acceleration and a smallest left-right acceleration from the left-right accelerations stored within the set time,
- extracting, from the left-right accelerations stored within the set time, a corresponding first left-right acceleration that is a value detected when the largest front-rear acceleration is detected, and a corresponding second left-right acceleration that is a value detected when the smallest front-rear acceleration is detected, and
- extracting, from the front-rear accelerations stored within the set time, a corresponding first front-rear acceleration that is a value detected when the largest left-right acceleration is detected, and a corresponding second front-rear acceleration that is a value detected when the smallest left-right acceleration is detected.

Tenth Aspect

The vehicle according to any one of the first to ninth aspects, wherein the vehicle is a utility vehicle.

Eleventh Aspect

The vehicle according to any one of the first to tenth aspects, wherein the processing circuitry executes the extraction of some of the state values and the transmission of the extracted state values in real time while the vehicle is traveling.

Twelfth Aspect

A data collection system that collects data, related to states of a vehicle, in a server,
- the data collection system including:
- at least one memory; and
- processing circuitry, wherein:
- the at least one memory stores state values detected by at least one state sensor with a predetermined detection cycle, the at least one state sensor detecting the state values that are parameters related to the states of the vehicle;
- the processing circuitry is configured to extract, every predetermined set time that is longer than the detection cycle, some of the state values stored within the set time such that the extracted state values include a largest value and a smallest value among the state values stored within the set time; and
- the processing circuitry is configured to transmit the extracted state values to the server.

According to the above aspect, while reducing the amount of data transmitted to the server, the largest value and smallest value of the state values which are the characteristic information in each set time can be transmitted to the server.

Thirteenth Aspect

The data collection system according to the twelfth aspect, wherein:
- the processing circuitry includes
  - first processing circuitry included in the vehicle and
  - second processing circuitry included in a mobile terminal;
- the first processing circuitry is configured to extract, every predetermined set time that is longer than the detection cycle, some of the state values stored within the set time such that the extracted state values include a largest value and a smallest value among the state values stored within the set time;
- the first processing circuitry is configured to transmit the extracted state values to the mobile terminal; and
- the second processing circuitry is configured to transmit the state values, received from the vehicle, to the server.

Fourteenth Aspect

The data collection system according to the twelfth or thirteenth aspect, wherein:
- the processing circuitry is configured to acquire identification information for identifying the vehicle and positional information indicating a position of the vehicle; and
- the processing circuitry is configured to transmit the identification information and the positional information to the server when transmitting the extracted state values to the server.

Fifteenth Aspect

The data collection system according to any one of the twelfth to fourteenth aspects, wherein:
- the vehicle includes a wheel;
- the processing circuitry includes third processing circuitry included in the server; and
- the third processing circuitry is configured to estimate tire force based on the state values received from the vehicle, the tire force being force acting on the wheel from a road surface.

Sixteenth Aspect

A method of collecting data related to states of a vehicle, the method being executed in a system including processing circuitry and at least one memory,
- the method including:
- storing state values that are parameters related to the states of the vehicle and are detected by at least one state sensor, supported by a vehicle body of the vehicle, with a predetermined detection cycle; and
- extracting, every predetermined set time that is longer than the detection cycle, some of the state values stored within the set time such that the extracted state values include a largest value and a smallest value among the state values stored within the set time.

According to the above aspect, the largest value and smallest value of the state values which are the characteristic information in each set time are extracted. With this, for example, even when a storage amount of data or a transmission amount of data is limited, processing can be performed such that the extracted state values include the largest state value and the smallest state value which are the characteristic information.

As described above, the embodiment has been described as an example of the technology disclosed in the present application. However, the technology in the present disclosure is not limited to this and is also applicable to embodiments in which modifications, replacements, additions, omissions, and the like are suitably made. Moreover, a new embodiment may be prepared by combining the components described in the above embodiment. For example, some of components or methods in one embodiment may be applied to another embodiment. Some components in an embodiment may be separated and arbitrarily extracted from the other components in the embodiment. Furthermore, the components shown in the attached drawings and the detailed explanations include not only components essential to solve the problems but also components for exemplifying the above technology and not essential to solve the problems.

What is claimed is:

1. A vehicle comprising:
   a vehicle body;
   at least one state sensor that is supported by the vehicle body and detects state values that are parameters related to states of the vehicle;
   a communicator supported by the vehicle body;
   at least one memory supported by the vehicle body; and
   processing circuitry supported by the vehicle body, wherein:
   the memory stores the state values detected by the state sensor with a predetermined detection cycle;
   the processing circuitry is configured to extract, every predetermined set time that is longer than the detection cycle, some of the state values stored within the set time such that the extracted state values include a largest value and a smallest value among the state values stored within the set time;
   the processing circuitry is configured to transmit the extracted state values through the communicator to an external device; and
   the set time is closer to a transmission cycle of the communicator than the detection cycle.

2. The vehicle according to claim 1, wherein extracting some of the state values stored within the set time denotes extracting, every set time, only some of the state values detected within the set time such that the extracted state values include the largest value and the smallest value among the state values stored within the set time.

3. The vehicle according to claim 1, wherein a total number of state values transmitted through the communicator is smaller than a total number of state values detected by the state sensor.

4. The vehicle according to claim 1, wherein after the processing circuitry extracts some of the state values, the processing circuitry deletes from the memory the state values that have not been extracted among the state values stored within the set time.

5. The vehicle according to claim 1, wherein the at least one state sensor detects accelerations of the vehicle.

6. The vehicle according to claim 5, wherein the accelerations of the vehicle include a front-rear acceleration and left-right acceleration of the vehicle.

7. The vehicle according to claim 1, wherein the communicator executes near field communication.

8. The vehicle according to claim 1, wherein:
   the at least one state sensor detects front-rear accelerations and left-right accelerations of the vehicle; and
   extracting, every set time, some of the state values stored within the set time such that the extracted state values include the largest value and the smallest value includes
      extracting a largest front-rear acceleration and a smallest front-rear acceleration from the front-rear accelerations stored within the set time,
      extracting a largest left-right acceleration and a smallest left-right acceleration from the left-right accelerations stored within the set time,
      extracting, from the left-right accelerations stored within the set time, a corresponding first left-right acceleration that is a value detected when the largest front-rear acceleration is detected, and a corresponding second left-right acceleration that is a value detected when the smallest front-rear acceleration is detected, and
      extracting, from the front-rear accelerations stored within the set time, a corresponding first front-rear acceleration that is a value detected when the largest left-right acceleration is detected, and a corresponding second front-rear acceleration that is a value detected when the smallest left-right acceleration is detected.

9. The vehicle according to claim 1, wherein the vehicle is a utility vehicle.

10. The vehicle according to claim 1, wherein the processing circuitry executes the extraction of some of the state values and the transmission of the extracted state values in real time while the vehicle is traveling.

11. A data collection system that collects data, related to states of a vehicle, in a server,
    the data collection system comprising:
    at least one memory; and
    processing circuitry, wherein:
       the at least one memory stores state values detected by at least one state sensor with a predetermined detection cycle, the at least one state sensor detecting the state values that are parameters related to the states of the vehicle;
       the processing circuitry is configured to extract, every predetermined set time that is longer than the detection cycle, only some of the state values stored within the set time such that the extracted state values include a largest value and a smallest value among the state values stored within the set time; and
       the processing circuitry is configured to transmit the extracted state values to the server.

12. The data collection system according to claim 11, wherein:
    the processing circuitry includes
       first processing circuitry included in the vehicle and
       second processing circuitry included in a mobile terminal;
    the first processing circuitry is configured to extract, every predetermined set time that is longer than the detection cycle, some of the state values stored within the set time such that the extracted state values include a largest value and a smallest value among the state values stored within the set time;
    the first processing circuitry is configured to transmit the extracted state values to the mobile terminal; and
    the second processing circuitry is configured to transmit the state values, received from the vehicle, to the server.

13. The data collection system according to claim 11, wherein:
    the processing circuitry is configured to acquire identification information for identifying the vehicle and positional information indicating a position of the vehicle; and
    the processing circuitry is configured to transmit the identification information and the positional information to the server when transmitting the extracted state values to the server.

14. The data collection system according to claim 11, wherein:
    the vehicle includes a wheel;
    the processing circuitry includes third processing circuitry included in the server; and
    the third processing circuitry is configured to estimate tire force based on the state values received from the vehicle, the tire force being force acting on the wheel from a road surface.

15. A method of collecting data related to states of a vehicle, the method being executed in a system including processing circuitry and at least one memory, the method comprising:
storing state values that are parameters related to the states of the vehicle and are detected by at least one state sensor, supported by a vehicle body of the vehicle, with a predetermined detection cycle;

extracting, every predetermined set time that is longer than the detection cycle, some of the state values stored within the set time such that the extracted state values include a largest value and a smallest value among the state values stored within the set time; and transmitting the extracted state values through a communicator to an external device, wherein the set time is closer to a transmission cycle of the communicator than the detection cycle.

* * * * *